INVENTORS
EDUARD C. VAN ERVEN DORENS
JAN CHRISTOFFEL JANSEN
BY

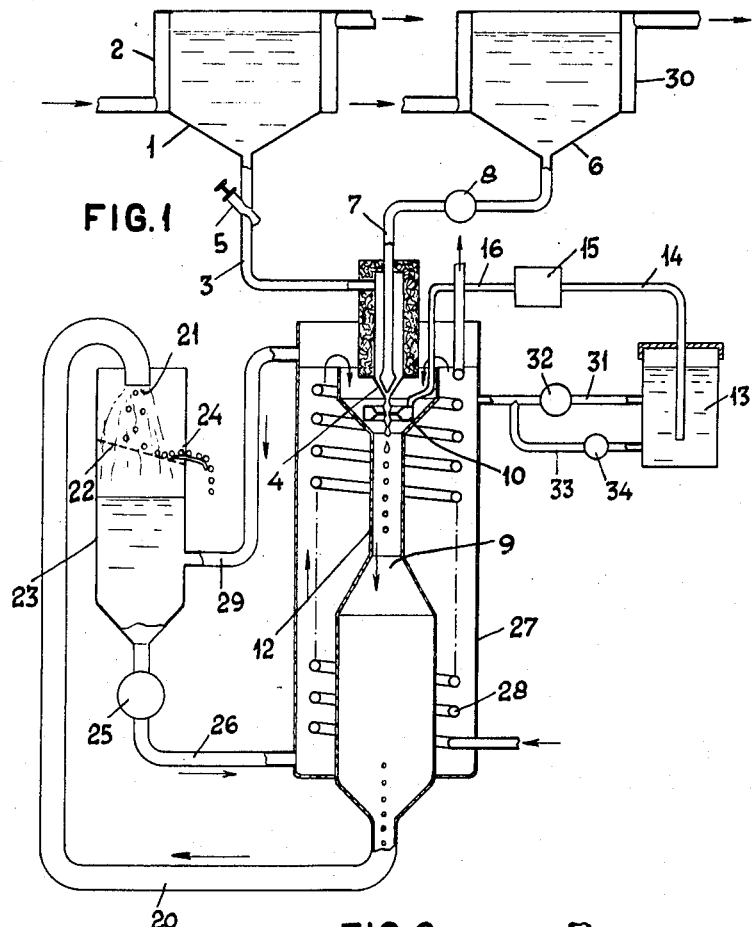

ATTORNEYS

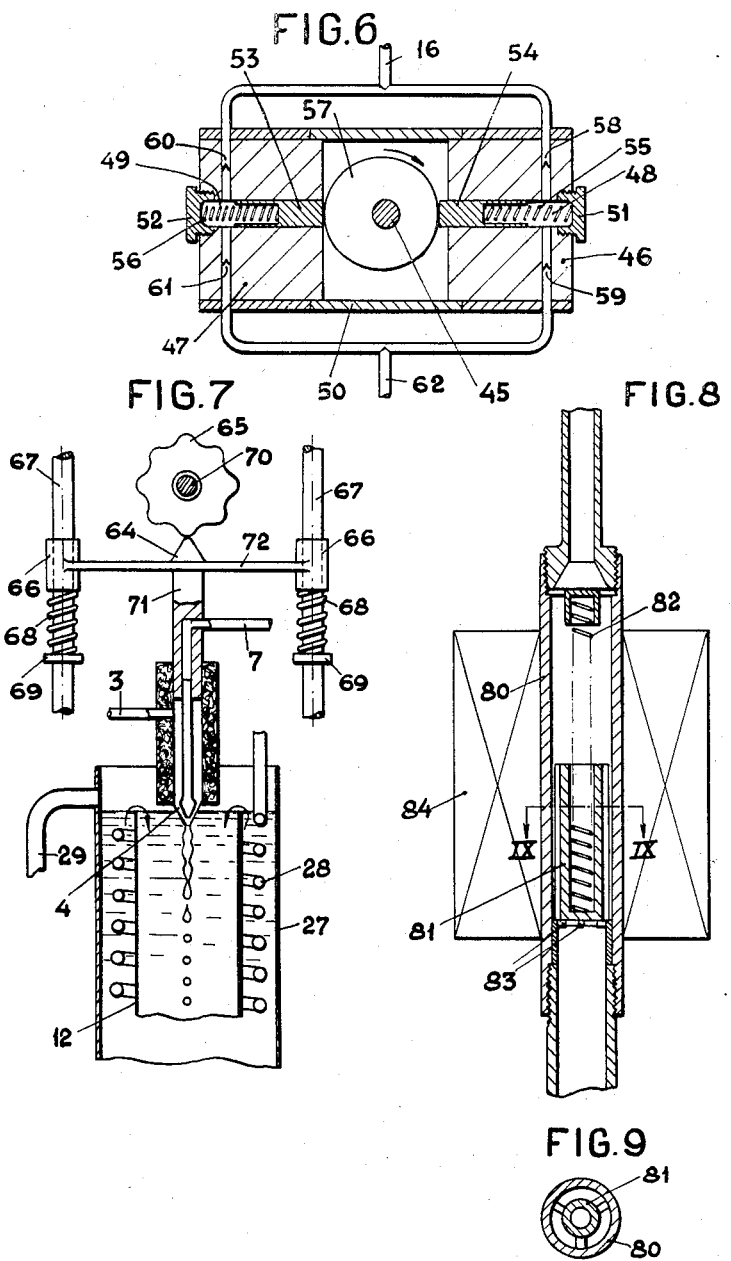

United States Patent Office 2,911,672
Patented Nov. 10, 1959

2,911,672
PROCESS AND APPARATUS FOR THE MANUFACTURE OF SEAMLESS FILLED CAPSULES

Eduard C. van Erven Dorens, Bussum, and Jan Christoffel Jansen, Nieuw-Loosdrecht, Netherlands, assignors to Globex International Limited, a corporation of Great Britain Application January 30, 1956, Serial No. 562,281

Claims priority, application Netherlands January 28, 1955

11 Claims. (Cl. 18—2.7)

The invention relates to a new process for the manufacture of seamless filled capsules and to the apparatus used in this process.

It is known to manufacture seamless filled capsules by extruding encapsulating material in a liquid state through an annular orifice, simultaneously extruding capsule filler material from a second orifice in the center of the annular orifice, separating said extruded materials from the orifices as compound drops with the encapsulating material surrounding the filler material and passing said compound drops through a liquid cooling medium to congeal the encapsulating shell.

Working according to this known process, capsules of good quality can be produced, especially if the viscosity of the encapsulating material at the extrusion temperature does not exceed 1500 centipoises, and preferably is between 500 and 1000 centipoises, and if both the encapsulating material and the filler material are continuously transported under the influence of a relatively low pressure to their orifices forming together a nozzle, and continuously extrude from this nozzle as compound drops. The production rate of this process is, however, limited to about 100 capsules per minute.

It is an object of the invention to provide a process and apparatus for the manufacture of seamless filled capsules having uniform size and weight at a rate much higher than the number of 100 per minute which can be attained with the known process working with continuous supply of filler material and encapsulating material to a nozzle under formation of composite drops.

A more detailed object of the invention is to discharge from a nozzle with concentric orifices a coherent continuous jet of liquid with a core consisting of capsule filler material and an outer jacket of encapsulating material in a liquid or molten state, to subject this jet to the action of a vibration which forms in this jet initial constrictions in the frequency of the vibration, whereupon the jet under the influence of natural forces constricts itself further and ultimately divides itself in composite drops consisting of a core of filler material enclosed in a shell of encapsulating material and of uniform size and weight and each containing the same quantity of filler material, and to cool these drops in order to congeal the shell material.

Another object is to provide apparatus by which a composite continuous jet consisting of a core of filler material and a jacket of encapsulating material is formed and in which a vibration is generated, acting on this jet and ultimately dividing the jet in uniform composite drops according to the frequency of the vibration.

Other objects and advantages of the invention will become apparent from the following detailed description taken in connection with the accompanying drawings in which:

Fig. 1 is a schematic view, partly a section, of an apparatus for carrying out the invention;

Fig. 2 is a section of that part of the device of Fig. 1 which exerts a vibration transmitted by the cooling liquid, to act on the composite coherent jet;

Figure 3:
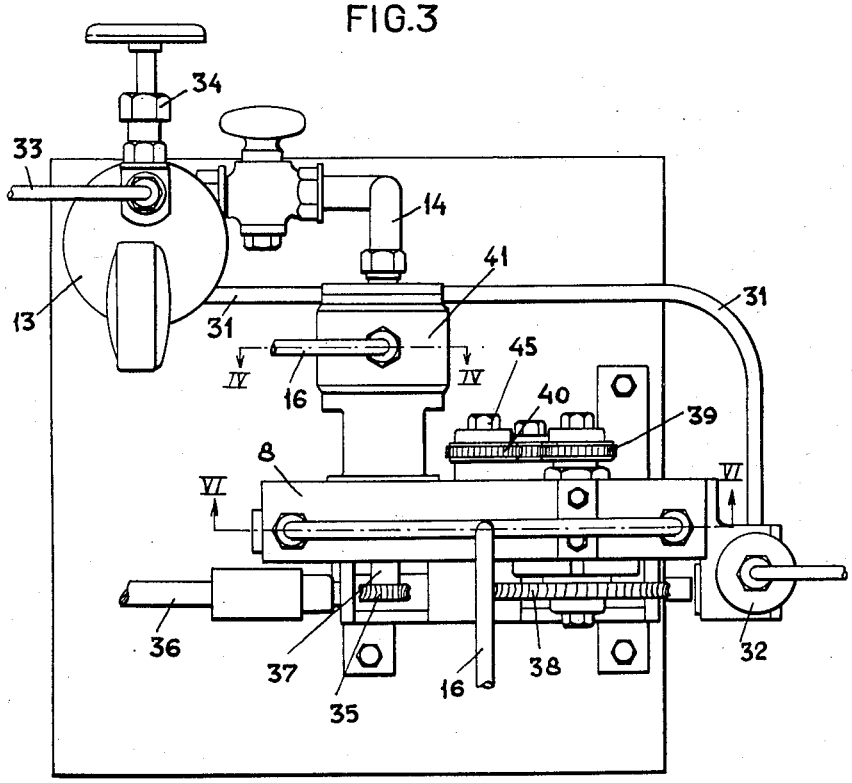
Figure 4:
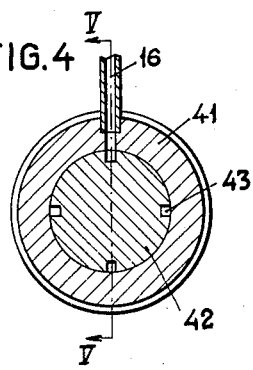
Figure 5:
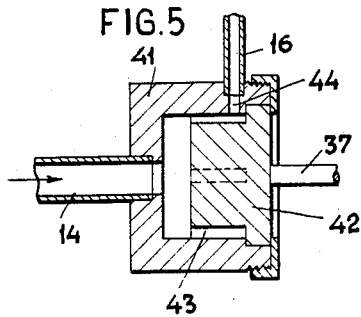

Fig. 3 is a schematic top view of a preferred embodiment of that part of the device of Fig. 1 comprising a filler pump and an interruptor which assure that always the same quantity of filler material is enclosed between two consecutive initial constrictions of the composite jet, and therefore assuring the production of seamless capsules all containing within very narrow limits the same quantity of filler material;

Fig. 4 is a cross-section of the interruptor according to line IV—IV of Fig. 3, showing some details of the construction;

Fig. 5 is a longitudinal section through this interruptor, according to line V—V of Fig. 4;

Fig. 6 is a section through the capsule filler pump according to line VI—VI of Fig. 3;

Fig. 7 is a schematic view, partly a section, of a part of a modified apparatus, wherein the nozzle extruding the composite coherent jet vibrates relative to the column of cooling liquid.

Fig. 8 is a section of still another apparatus according to the invention, wherein the generated vibration acts on the filler in the conduit, conducting this filler material to the nozzle, and is transmitted by this filler material to the composite jet.

Fig. 9 is a cross-section of the apparatus of Fig. 8 according to the line IX—IX of Fig. 8.

In Fig. 1 container 1 contains an encapsulating material in liquid state, e.g. a mixture of gelatin, water and glycerin. The contents of the tank can be heated to any suitable temperature; in the figure is indicated a jacket 2 through which a heating or cooling liquid can be circulated. From this tank the encapsulating material flows by gravity through conduit 3 to a nozzle 4. The quantity of encapsulating material flowing through the conduit and from the annular orifice of the nozzle can be adjusted by valve 5 and depends further on the hydrostatic head and the viscosity of the liquid and on the hydrodynamic resistance of the conduit and the nozzle. The preferred range of the viscosity of the encapsulating material at the working temperature is from about 400 centipoises to about 1000 centipoises; viscosities of more than 1500 centipoises or less than 100 centipoises should be avoided. The best results were obtained in this apparatus at a viscosity of about 650 centipoises at the working temperature.

Container 6, which also is provided with a heating jacket 30, contains capsule filler material, e.g. an oil wherein a medicinal component is dissolved. From this tank 6 the capsule filler material flows through conduit 7 to the central orifice of nozzle 4. This flow may be caused by gravity only, and then an adjusting valve in this conduit is necessary. It is, however, preferred to transport the capsule filler material from tank 6 to the nozzle by a pump 8 which is of a type that at a fixed speed transports continuously a constant stream of filler material to the nozzle. If the filler material is transported to the nozzle by gravity only, viscosities of the oil of between 25 and 150 centipoises are preferred, and the filler material in tank 6 can be heated or cooled in order to obtain this viscosity. If, however, the filler is transported by a constant delivery pump 8, the viscosity of the oil is of little or no influence. However, a constant temperature of the filler material is desired in order to avoid differences in weight of the filler in the manufactured capsules, as this pump transports a constant volume of filler material.

If the capsule shell consists of gelatin, and the filler is an oil, temperatures of about 60–70° C. for the gelatin in container 1 and of about 25–35° C. for the oil in container 6 give good results.

The combined stream of encapsulating material and of filler material extrudes from the nozzle 4 as a composite coherent jet, consisting of a core of filler material and a jacket of encapsulating material. The outer orifice of the nozzle may be below the level of the cooling liquid 9.

Well below this orifice is placed a hollow ring 10 with an annular orifice or slit 11 (Fig. 2) concentric with and facing the coherent composite jet of liquid extruded from the orifices of the nozzle. From this annular slit 11 intermittently cooling liquid is extruded under hydraulic pressure. The pressure impulses are transmitted by the cooling liquid in the container 12 between the annular orifice 11 and the composite jet and act on this jet as a vibration. This action on the jet results in the formation of initial constrictions in the jet. Under the influence of natural forces as e.g. surface tension and gravity, the jet on its way through the cooling liquid constricts itself further in the places of the initial constrictions and ultimately breaks into separate composite drops, consisting of a core of filler material and a shell of encapsulating material. In their further way down through the cooling liquid in the container 12 these drops assume a substantially spherical shape and are cooled to a temperature at which the shell material congeals so that seamless filled capsules result. As the initial constrictions are formed in the jet in the frequency of the vibration, their size depends only on the quantity of the liquids flowing in each cycle of the vibration from the nozzle. Therefore, at a constant delivery speed of the filler material and at a constant frequency, the capsules contain substantially the same quantities of filler material. Generally, the differences in weight of the filler are less than 2%. By varying the delivery speed, as well as by varying the frequency, a filler content of between 10 and 500 milligrams can easily be obtained.

The cooling liquid, extruding through annular slit 11, flows from the pressure tank 13 through conduit 14, the rotating interruptor 15 and conduit 16 to the circular chamber 18 (Fig. 2) in the upper part of the ring or pulsator 10, and from this annular chamber 18 to a second annular chamber 17 through a number of conduits 19 between these annular chambers in order to get an even supply of liquid to the whole circumference of the annular slit 11. The width of the slit 11 can be adjusted at will because the lower part 63 of ring 10 threadedly engages with the main body 10.

The distance between the nozzle and the place of the annular slit 11 should not be too large in order to avoid formation of initial constrictions caused by natural forces which would unfavourably interfere with the initial constrictions caused by the vibration. A vertical distance of between 0.4 and 2 cm. between nozzle and pulsator slit is generally preferred.

If the frequency of the vibration and with it the rate of drop formation is increased to more than about 250 per minute, the distance between consecutive drops is not longer sufficient to avoid the danger of contact of two drops falling in the cooling liquid under the influence of gravity only. To avoid contact of drops before the shells are congealed a moving or flowing cooling liquid should be applied transporting the drops away from the places where they are formed by the combined forces of gravity and of the flow of the cooling liquid through the container.

In Fig. 1 is indicated a downward flow of the cooling liquid in the container 12, and capsules and cooling liquid flow through the conduit 20 to the orifice 21, which orifice is well below the level of the cooling liquid in the container 12, so that the liquid is transported by hydrostatic forces. From orifice 21 liquid and capsules fall on an oblique strainer 22 in a container 23. The cooling liquid passes through the strainer into the lower part of the container, and the capsules, separated from the liquid, are continuously delivered through slit 24. The cooling liquid is pumped from container 23 by pump 25 through conduit 26 to a jacket 27 of container 12. This conduit may be provided with a filter and with a container with silicantgel for retaining condensed water if the cooling liquid is an oil such as paraffin oil. In this jacket a cooling coil 28, connected with a refrigerator (not indicated) cools the liquid to the desired temperature. The cooling liquid in this jacket flows upward, and on the upper side it flows over the upper edge of container 12 back in this container. A bypass 29 prevents the liquid in the container 12 and the jacket 27 from rising to an undesirable high level.

The necessary linear velocity of the cooling liquid downwards in the container 12 depends on the production rate as well as on the size of the capsules. At a production rate of about 500 capsules per minute of a total weight of about 100 mg., a velocity of about 14 cm. per second avoids any danger of contact of the drops before the shell is congealed.

The pressure tank 13 is fed through conduit 31 by pump 32 from the upper part of jacket 27, with the result that cooled cooling liquid flows into tank 13. A pressure valve 34 in bypass 33 maintains a constant pressure in the tank, which may be about ½ kg./cm.$^2$ if the slit in pulsator 10 has a width of about 0.02 cm. and the interruptor 15 acts so that the duration of the pressure impulse is about $\frac{1}{10}$ to $\frac{1}{3}$ of the interval between two consecutive impulses. However, this pressure is not critical, and may very with the width of the slit, higher pressure corresponding with a narrower slit and lower pressure with a wider slit. High pressure combined with a relatively long duration of the impulses and a wide slit disturb the regular drop formation.

Capsules having substantially equal filler contents are formed if a constant quantity of filler material is transported by pump 8 in any period between two consecutive pressure impulses of cooling liquid from the annular slit 11. According to Fig. 3 the shaft 36 drives, by means of a worm, the worm-wheel 35 on the shaft 37 of the interruptor 15. The same shaft 36, by means of another worm, drives the interchangeable worm-wheel 38, which is attached to the same shaft as the interchangeable gear-wheel 39, driving by a pinion the interchangeable gear-wheel 40, attached to the shaft 45 of pump 8 which transports the filler through conduit 16 to the nozzle. By this manner of coupling the interruptor 15 with the pump 8 a predetermined constant quantity of filler material is transported by the pump and extruded in the composite jet in any cycle of the vibration. By replacing the interchangeable toothed wheels 38, 39, 40 by others with another number of teeth, the proportion of the speed of pump 8 and of interruptor 15 can be adjusted as desired.

The interruptor 15 may be of any type which enables to feed intermittently with accurately equal intervals between two consecutive extrusions in accurately equal cycles liquid from tank 13 to conduit 16. The type indicated in Figures 3, 4 and 5 consists of a housing 41 with a cylindrical bore. In this bore rotates a cylindrical rotator 42 with four slits 43 driven by shaft 37. The four slits have accurately the same width, and are accurately spaced on equal distances along the circumference of the rotating cylinder 42. On rotating of the rotator the right end of each of the slits is therefore brought in intermittent communication with the orifice of bore 44, to which conduit 16 is connected, each consecutive communication causing an extrusion of the cooling liquid from the annular slit 11 of the ring 10.

The pump 8 may be of any type which gives a constant delivery of filler material in the jet. The preferred type (Fig. 6) has two housings 46, 47, connected by the cylindrical body 50. In each housing a cylindrical bore 48, 49 is provided, closed at the outer ends by screwed covers 51, 52. In bore 48 the piston 54 moves backward and forward and in bore 49 piston 53, driven by the rotating disc 57 which gives the pistons 53 and 54 a constant speed. Springs 55 and 56, exerting pressure between cover 51 and piston 54 and between cover 52 and piston 53 respectively, press continuously the pistons against the rotating disc 57, thus assuring that both pistons have a constant linear speed. On rotation of disc 57, in the indicated direction, filler material is sucked from container 6 through conduit 62 and through valve 61 which by the pressure difference is lifted from its seat into cylinder 49, and valve 60 is closed on its seat by the pressure in conduit 16. Simultaneously the filler content from cylinder 48 is transported through valve 58, which is lifted from its seat by the pressure of the filler, into and through conduit 16, whereas valve 59 is closed. After disc 57 has made a half rotation, the linear motion of the pistons is reversed; valves 58 and 61 are closed and valves 59 and 60 lifted, and the contents of cylinder 49 is delivered in conduit 16 with constant speed and cylinder 48 is filled.

The following examples are intended to give some of the possibilities of the process of the invention, without, however, limiting its scope.

*Example 1*

Container 1 was filled with gelatin at 70° C. (viscosity at 60° C. about 600 centipoises), the hydrostatic head of the gelatin being 16 cm. and the diameter of the annular orifice 0.3 cm. Container 6 was filled with a solution of vitamins A and D in oil, with a specific gravity of 0.907 at 30° C. The volume of oil, displaced per minute by the pump 8 was 19.13 cm.$^3$, that is 17.38 g. The diameter of the inner orifice of the nozzle was 0.08 cm. The container 12 and the tank 13 contained as cooling liquid paraffin oil at a temperature of about 5° C., the interrupter extruded exactly 8 times per second during 0.02 second paraffin oil through the pulsator slit 11. The pressure of the oil in tank 13 amounted to about 1000 g./cm.$^2$. The diameter of the annular slit of the pulsator was 1.0 cm. and the width of the slit 0.02 cm., and this slit was located about 0.6 cm. below the nozzle.

The time-interval between the end of an extrusion of oil and the beginning of the next one was 0.105 second. 8 capsules with a filler weight of about 36 mg. and a total weight of about 80 mg. were formed per second. A linear downward velocity of the cooling liquid of about 12 cm. per second proved to be sufficient to avoid contact of drops in the cooling liquid before solidifying of the shells. The difference in weight of the filler of a series of capsules was less than 0.5 mg.

*Example 2*

Container 1 contains gelatin at 64° C. and of a viscosity of 615 centipoises at 60° C.; container 6 a medical oil with a specific gravity of 0.925 at the working temperature of 30° C. of the oil. The diameter of the annular orifice of the nozzle was 0.4 cm.; that of the inner orifice 0.11 cm. The pump 8 discharged 39.7 g. of the medical oil through the nozzle. Through the slit of 0.025 cm. of the pulsator which had a diameter of 1 cm. and which was placed about 0.9 cm. under the nozzle, 4 impulses of paraffin oil were extruded per second, each impulse having a duration of 0.05 sec. per minute, 240 capsules having a total weight of about 310 mg. and containing between 164 and 166 mg. of filler were formed.

Working with a hydrostatic head of 43 cm. and without pump 8, 240 capsules, with a filler weight of between 146 and 152 mg., were obtained per minute.

The process of the invention is, however, not limited to the application of a vibration by a pulsator as described, but can also be carried out by any apparatus generating a vibration acting on the composite jet of liquid and forming constrictions in this jet.

Another type of such an apparatus is partly indicated in Fig. 7. In the apparatus of this type nozzle 4 is connected by the feed lines 3 and 7 and flexible conduits (not indicated) with the liquid containers for the encapsulating material and the filler material. The nozzle is fixed to rod 71, bearing a tooth 64. Rod 71 is attached to a transverse rod 72 carrying two sleeves 66, movable along the fixed rods 67. Well below these sleeves these rods are provided with a shoulder 69. Pressure springs 68, resting against these shoulders, exert an upward pression against the sleeves 66 and press tooth 64 against the toothed wheel 65, rotating on shaft 70 which is supported by sleeves attached to the fixed rods 67. This rotation of toothed wheel 65 gives the nozzle 4 a vertical vibration relative to the container 12. This vibration results in the formation of initial constrictions in the coherent continuous composite jet of liquid extruding from the nozzle in the frequency of the vibration whereupon the jet under the influence of natural forces constricts itself further in the places of the induced initial constrictions and ultimately divides itself into separate drops, consisting of a core of filler material and a shell of encapsulating material which congeals in the cooling liquid.

It is self-evident, that when coupling the shaft 70 of the toothed wheel 65 and the driving means of a constant delivery pump of filler material, a constant quantity of filler material is extruded from the nozzle in any cycle of the vibration which results in the formation of composite drops containing a substantially equal quantity of filler material. The stroke of the nozzle should preferably be between about 1 and 1.5 times the diameter of the drops; very good and uniform results were attained with a stroke of about 120% of this diameter.

The maximum production rate of capsules of a weight of less than about 100 mg. of an apparatus of this type is, however, somewhat less than that of the first described type and amounts to about 350 capsules per minute as compared to about 500–600 per minute with the apparatus with the pulsator.

As an example of the production rate of this type of apparatus can be said, that about 240 capsules could be made of the components, mentioned in Example 2, with a total weight of about 400 mg. and a filler weight of 200 mg.

A third manner of carrying out the process of the invention can be achieved with the vibrator shown in Figures 8 and 9. Conduit 80 contains a core 81 of magnetic material as iron, which by helicoidal pressure spring 82 is pressed onto the protrusions 83 of the wall of conduit 80. This core is periodically lifted by a periodical magnetic field, induced by current impulses through the coil 84 around the conduit. This vibrating core induces a vibration in the liquid in the conduit. If such a vibrator is placed either in the conduit 3 of the encapsulating material to the nozzle or in the conduit 7 of the filler material to the nozzle, the composite jet, extruded from this nozzle, constricts in the frequency of the vibration, which constrictions ultimately divide the jet into separate drops. By coupling the interruptor of the current with the pump of the filler material, a substantially equal filler content of the capsules is guaranteed.

*Example 3*

With a vibrator of the type of Figures 8 and 9 in the conduit 7, container 1 containing gelatin of a viscosity of about 460 centipoises at the working temperature of 65°

C.; a diameter of the annular orifice of the nozzle of 0.5 cm.; cod-liver-oil of 30° C. as filler material in container 6, and working without pump in the conduit 7 and with a hydrostatic head of the oil of 40 cm., 240 capsules were obtained per minute with 4 current impulses per second. These capsules contained between 142 and 154 mg. of cod-liver-oil and had a total weight of about 300 mg.

We claim:

1. A process for the manufacture of seamless filled capsules, comprising extruding continuously and downwardly encapsulating material in liquid form through a first orifice and extruding continuously liquid filler material from a second orifice in the center of the first orifice, said liquids forming together a coherent composite jet consisting of a core of filler material and a jacket of encapsulating material, passing this jet into a cooling liquid and before congealing of the encapsulating material subjecting it to a vibration of regular frequency by consecutive pressure impulses of the cooling liquid on the coherent jet, resulting in formation of initial constrictions in said jet corresponding with the frequency of the vibration, whereupon the jet under the influence of natural forces constricts itself further in the places of the induced constrictions and ultimately divides itself into separate drops consisting of a core of filler material, and congealing the encapsulating shells by cooling the drops in a liquid cooling medium.

2. The process of claim 1, in which a predetermined equal quantity of filler material is extruded from the second orifice in any period between consecutive pressure impulses of the cooling liquid on the coherent jet, resulting in formation of composite drops containing a substantially equal quantity of filler material.

3. A process for the manufacture of seamless filled capsules, comprising extruding downwardly encapsulating material in liquid form through a first orifice and extruding filler material from a second orifice in the center of the first orifice by means of a constant delivery pump, said liquids forming together a coherent composite jet consisting of a core of filler material and a jacket of encapsulating material, passing this jet into a cooling liquid and before congealing of the encapsulating material subjecting it to periodical impulses of the cooling liquid, generated by consecutive periodical extrusions of cooling liquid under hydraulic pressure from an annular slit concentric with and facing the coherent jet, wherein in any period between two consecutive extrusions of cooling liquid from the annular slit a predetermined quantity of filler material is extruded from the second orifice resulting in formation of initial constrictions in said jet so that this contains a substantially equal quantity of filler material between two consecutive constrictions whereupon the jet under the influence of natural forces constricts itself further in the places of the initial constrictions and ultimately divides itself into separate drops consisting of a core of an equal quantity of filler material and a shell of encapsulating material, and congealing the encapsulating shells by further cooling said drops to a temperature below the melting point of the encapsulating material.

4. The process of manufacturing seamless filled capsules, comprising subjecting a continuous coherent composite jet of liquid issuing from a nozzle and consisting of a core of filler material and a jacket of encapsulating material in a liquid state to the action of a vibration of regular frequency after said composite jet has left the nozzle, resulting in formation of initial constrictions in said jet corresponding with the frequency of the vibration, whereupon the jet under the influence of natural forces constricts itself further in the places of the induced constrictions and ultimately divides itself into separate composite drops consisting of a core of filler material and a shell of encapsulating material, and congealing the encapsulating shells by cooling the drops in a liquid cooling medium in which the composite drops are moved away downwardly from the place where they are formed by gravity.

5. The process of manufacturing seamless filled capsules, comprising subjecting a continuous coherent composite jet of liquid issuing from a nozzle and consisting of a core of filler material and a jacket of encapsulating material in a liquid state to the action of a vibration of regular frequency after said composite jet has left the nozzle, resulting in formation of initial constrictions in said jet corresponding with the frequency of the vibration, whereupon the jet under the influence of natural forces constricts itself further in the places of the induced constrictions and ultimately divides itself into separate composite drops consisting of a core of filler material and a shell of encapsulating material, and congealing the encapsulating shells by cooling the composite drops in a liquid cooling medium in which the composite drops are moved away from the place where they are formed by the combined forces of gravity and of flow of the cooling liquid.

6. The process of cliam 5 in which the composite drops are moved away downwardly from the place where thye are formed by the combined forces of gravity and of downward flow of the circulating cooling liquid.

7. The process of claim 6 in which the cooling liquid with the capsules is fed continuously into a container including a strainer, continuously separating the cooling liquid from the caspules on said strainer, continuously removing the capsules and continuously returning the cooling liquid after further cooling to the container in which the composite drops are formed.

8. An apparatus for continuously producing seamless filled capsules, comprising means for forming a continuous downwardly flowing composite stream composed of a solid stream of liquid capsule filler material encased by a substantially cylindrical stream of encapsulating material and passing said composite stream into a container with cooling liquid said means consisting essentially of a downwardly facing extrusion nozzle including an annular downwardly facing first orifice and a substantially circular downwardly facing second orifice located concentrically within said first orifice, pressure means for continuously and simultaneously supplying and extruding encapsulating material through said first orifice and capsule filler material through said second orifice, and a container for cooling liquid normally present therein below and immediately adjacent said orifices, and means below the top of the container and exit of the nozzle for exerting a pressure impulse of regular frequency on said cooling liquid substantially below said orifices.

9. The apparatus according to claim 8, wherein the means for exerting the pressure impulse on said cooling liquid comprise an annular slit facing the composite stream, said slit being concentric with said composite stream, and means for periodically extruding cooling liquid under pressure from said slit in transverse relationship to said composite stream.

10. The apparatus according to claim 9, wherein the frequency of the pressure impulse means is in fixed relation to the capsule filler material delivery means.

11. An apparatus for continuously producing seamless filled capsules, comprising means for forming a continuous downwardly flowing composite stream composed of a solid stream of liquid capsule filler material encased by a substantially cylindrical stream of encapsulating material and passing said composite stream into a container with cooling liquid, said means consisting essentially of a downwardly facing extrusion nozzle including an annular downwardly facing first orifice and a substantially circular downwardly facing second orifice located concentrically within said first orifice, pressure means for continuously and simultaneously supplying and extruding encapsulating material through said first orifice and capsule filler material through said second orifice, and a container for cooling liquid normally present therein below and immediately adjacent said orifice, and means for exerting a vibration of regular frequency on said composite stream after it has left the nozzle.

References Cited in the file of this patent

UNITED STATES PATENTS

| | | |
|---|---|---|
| 814,773 | Dixon et al. | Mar. 13, 1906 |
| 2,332,671 | Scherer | Oct. 26, 1943 |
| 2,379,816 | Mabbs | July 3, 1945 |
| 2,471,358 | Stephenson | May 24, 1949 |
| 2,510,574 | Greenhalgh | June 6, 1950 |
| 2,531,986 | Pile et al. | Nov. 28, 1950 |
| 2,572,998 | Eisner | Oct. 30, 1951 |
| 2,714,224 | Schaub | Aug. 2, 1955 |